US007203734B2

(12) United States Patent  
Rudy et al.

(10) Patent No.: US 7,203,734 B2  
(45) Date of Patent: Apr. 10, 2007

(54) METHODS AND APPARATUS FOR SELECTING AN INSURANCE CARRIER FOR AN ONLINE INSURANCE POLICY PURCHASE

(75) Inventors: Robert Rudy, Glencoe, IL (US); Bruce Weiner, Chicago, IL (US); Robert Eisenhart, Westchester, IL (US); James Watson, Aurora, IL (US)

(73) Assignee: InsuranceNoodle, Inc., Chicago, IL (US)

(*) Notice: Subject to any disclaimer, the term of this patent is extended or adjusted under 35 U.S.C. 154(b) by 856 days.

(21) Appl. No.: 10/034,889

(22) Filed: Dec. 28, 2001

(65) Prior Publication Data

US 2003/0125990 A1 Jul. 3, 2003

(51) Int. Cl.  
G06F 15/16 (2006.01)

(52) U.S. Cl. .............................. 709/218; 705/4; 705/26

(58) Field of Classification Search ................ 709/218, 709/232, 246; 705/4, 37, 26; 707/5  
See application file for complete search history.

(56) References Cited

U.S. PATENT DOCUMENTS

| 4,831,526 | A | * | 5/1989 | Luchs et al. ..................... 705/4 |
| 5,613,072 | A | * | 3/1997 | Hammond et al. ............. 705/4 |
| 5,797,134 | A | | 8/1998 | McMillan et al. ........... 705/400 |
| 5,809,478 | A | | 9/1998 | Greco et al. |
| 5,842,178 | A | * | 11/1998 | Giovannoli ................... 705/26 |
| 5,987,434 | A | | 11/1999 | Libman |
| 6,064,970 | A | | 5/2000 | McMillan et al. .............. 705/4 |
| 6,076,072 | A | | 6/2000 | Libman |
| 6,148,298 | A | * | 11/2000 | LaStrange et al. .............. 707/5 |
| 6,556,976 | B1 | * | 4/2003 | Callen ........................... 705/37 |
| 6,594,635 | B1 | | 7/2003 | Erlanger ......................... 705/4 |
| 6,684,189 | B1 | * | 1/2004 | Ryan et al. ..................... 705/4 |
| 6,862,571 | B2 | | 3/2005 | Martin et al. .................. 705/4 |
| 6,868,386 | B1 | | 3/2005 | Henderson et al. ............ 705/4 |
| 2001/0049611 | A1 | | 12/2001 | Peach ............................ 705/4 |
| 2002/0026334 | A1 | | 2/2002 | Igoe ............................... 705/4 |
| 2002/0082876 | A1 | | 6/2002 | Martin et al. .................. 705/4 |
| 2002/0087354 | A1 | | 7/2002 | Martin et al. .................. 705/2 |
| 2002/0123910 | A1 | | 9/2002 | Hereford et al. ............... 705/4 |
| 2003/0046115 | A1 | | 3/2003 | Hisano .......................... 705/4 |
| 2003/0055778 | A1 | | 3/2003 | Erlanger ...................... 705/38 |
| 2003/0074277 | A1 | | 4/2003 | Foutz ........................... 705/26 |
| 2003/0083906 | A1 | | 5/2003 | Howell et al. ................. 705/4 |

(Continued)

OTHER PUBLICATIONS

Coverage Connect, "Empowering the Property & Casualty Marketplace".  
U.S. Appl. No. 60/329,905, entitled "Method and Apparatus for Generating Insurance Quotes," filed on Oct. 16, 2001 (31 pages).  
U.S. Appl. No. 60/336,887, entitled "System and Method for Electronically Creating, Filing, and Approving Applications for Insurance Coverage," filed on Nov. 7, 2001 (27 pages).

*Primary Examiner*—Andrew Caldwell  
*Assistant Examiner*—Stephan Willett  
(74) *Attorney, Agent, or Firm*—Marshall, Gerstein & Borun LLP

(57) ABSTRACT

Methods and apparatus for selecting an insurance carrier for an online insurance policy purchase are disclosed. A user at a client device, such as a personal computer connected to the Internet, receives a plurality of business insurance quotes with minimal data input requirements. A plurality of insurance carriers are narrowed down to a few relevant insurance carriers based on the user's zip code, standard industrial code (SIC), desired insurance products, a small number of "kill" questions, and a customized insurance application which is dynamically generated in response to previous answers.

25 Claims, 16 Drawing Sheets

U.S. PATENT DOCUMENTS

| | | | |
|---|---|---|---|
| 2003/0093365 A1 | 5/2003 | Halper et al. | 705/38 |
| 2003/0093366 A1 | 5/2003 | Halper et al. | 705/38 |
| 2003/0144887 A1 | 7/2003 | Debber | 705/4 |
| 2003/0177032 A1 | 9/2003 | Bonissone et al. | 705/2 |
| 2003/0182159 A1 | 9/2003 | Bonissone et al. | 705/2 |
| 2003/0187696 A1 | 10/2003 | Bonissone et al. | 705/4 |
| 2003/0187697 A1 | 10/2003 | Bonissone et al. | 705/4 |
| 2003/0187698 A1 | 10/2003 | Bonissone et al. | 705/4 |
| 2003/0187699 A1 | 10/2003 | Bonissone et al. | 705/4 |
| 2003/0187700 A1 | 10/2003 | Bonissone et al. | 705/4 |
| 2003/0187703 A1 | 10/2003 | Bonissone et al. | 705/4 |
| 2003/0200125 A1 | 10/2003 | Erlanger | 705/4 |
| 2004/0024618 A1 | 2/2004 | Martin et al. | 705/2 |
| 2004/0078249 A1 | 4/2004 | Hereford et al. | 705/4 |
| 2004/0153362 A1 | 8/2004 | Bauer et al. | 705/10 |
| 2005/0137915 A1 | 6/2005 | Martin et al. | 705/4 |
| 2005/0182666 A1 | 8/2005 | Perry et al. | 705/4 |
| 2005/0182668 A1 | 8/2005 | Debber | 705/4 |

\* cited by examiner

FIG. 8

Carpenters

Carpenters face property and liability risks ranging from broken equipment to materials theft to plant fires. You may worry about equipment failure and the consequences of being "down" for a period of time.

InsuranceNoodle helps carpenters and cabinetry contractors get the right insurance at the right price. Through experience and research, we know what contractors need. Here are some examples of the coverages we often recommend to carpenters and cabinetry contractors:

- You arrive at a job site in the morning and discover that some of your materials were stolen during the night. Materials On-Site Coverage would reimburse you for your loss.
- Upon further investigation you discover some of you tools missing also. Contractor's Equipment and Tools Coverage would reimburse you for your tools.
- Rental Reimbursement for Tools and Equipment Coverage would cover the cost of renting tools until you could replace yours.

We work with cabinetry contractors and carpenters regularly and have ongoing relationships with insurers that specialize in your field. Our on-line application is customized for your needs. The application asks about your business, assets and employees. After you submit your application, you'll get up to three proposals from our insurers. If you like what you see, you can buy policies online.

Try our free, easy service now by entering your zip code below.

Zip Code: [____] [Go] — 802

[Back]

Home | Contact Us | Privacy Policy | Legal | FAQ | What's New | Glossary
InsuranceNoodle, Inc. ©2001
®InsuranceNoodle Logo is the registered trademark of InsuranceNoodle Inc.

FIG. 11

InsuranceNoodle. Products - Microsoft Internet Explorer

File Edit View Favorites Tools Help | Adress | https://www.insurancenoodle.com/secure/GetQuote/industries.asp

NOODLE *an intelligent place to buy insurance*

Home | Get Free Quote | Products & Services | My Business Insurance | About Us | Glossary | Partner Network Product & Selection》Profile》General Info》Business Owners》Workers Comp》Auto》Umbrella》PL》EPLI》Submit Application

Small Business Insurance for Service

Your business may face property and liability risks ranging from slip-and-fall lawsuits to employee theft. You may worry about the consequences of having to close for a while after a fire or other catastrophe.

We'll help you find the right policies to cover the risks your business faces. Let's begin the application process!

1. The first step is to decide what kinds of coverage you want quotes on. The application length reflects how many choices you make.
2. Next, fill in the on-line application. You can print out the application and save your work at any point.
3. After you submit your completed application, you will be notified via e-mail when your proposals are ready for review.
4. If you like what you see, you can buy policies online.

☐ Business Owner's Policy
☐ Workers' Compensation
☐ Commercial Auto Insurance
☐ Umbrella Insurance
☐ Professional Liability — 1106
☐ Employment Practices Liability Insurance

1102

Once you have checked the products you are interested in, please enter your email address and a password to continue. Your password should be at least 6 characters long:

1104

Email Address: [_____] — 1108
Password: [_____]
Confirm Password: [_____] — 1110

Hide Webster

Tips for filling out this page:

Check the box next to the product(s) you are interested in.

Click underlined text for more information about our offered products.

FIG. 13

Do you have a current Business Owner's Policy?  ◯ Yes  ◯ No

Have any of your business insurance policies been declined, non-renewed or cancelled in the last 3 years?  ◯ Yes  ◯ No Has your business had any property or general liability losses within the last 5 years?  ◯ Yes  ◯ No Do you draw plans, designs, or specifications of others or do design work?
Do you have any mobile equipment? (i.e., backhoe, bobcat, etc.)  ◯ Yes  ◯ No Do you use any heavy or extra-heavy equipment?  ◯ Yes  ◯ No
Is any of your equipment leased, loaned or rented to others?  ◯ Yes  ◯ No
Do your employees perform any outside work more than 3 stories high?  ◯ Yes  ◯ No
What percentage of your work is residential?  [ ] %
What percentage of your business is interior work?  [ ] %

Do you do any shop work?  ◯ Yes  ◯ No

1302

Hide Webster

Have questions? Feel free to CONTACT US for support. (7:00 am to 7:00pm, Central Time, Monday through Friday)

FIG. 14

Bread and Other Bakery Products, Except Cookies and Crackers Auto Policy Proposal

| | The Hartford | TheStPaul | Kemper |
|---|---|---|---|
| | Accept | Accept | Accept |
| Price | Print View | Print View | Print View |
| | $1,000.00 | $1,995.00 | $1,800.00 |
| | Hartford AF from | St. Paul AF from | Kemper AF from |
| Proposal Options: | | | |
| Combined Single Limit Of Liability | $500,000 | $500,000 | $500,000 |
| Personal Injury Protection | Not Applicable | Not Included | Not Applicable |
| Medical Payments | $5000 | $5,000 | $5000 |
| Uninsured/Underinsured Motorists | $500,000 | $500,000 | $500,000 |
| Hired and Non-Owned Liability | Included | Included | Included |
| Comprehensive Deductible | $250 | $250 | $250 |
| Rental Reimbursement | $2,000 | $2,000 | $2,000 |
| Towing & Labor | $25 | $25 | $25 |
| Hired Car Physical Damage | &40,000 | &40,000 | &40,000 |
| Collision Deductible | $250 | $250 | $250 |
| Drive Other Car | Not Included | Included | Not Included |

This Proposal is valid for 30 days or your requested effective date, whichever is earlier. Coverage is subject to policy terms and conditions. Available options and coverages may vary state by state. In no event will InsuranceNoodle.com or any of its participating insurance carriers be liable in tort or in contract to anyone for any lack of knowledge or completeness of recommendation.

Home I Contact Us I Privacy Policy I Legal I FAQ I What's New I Glossary
InsuranceNoodle, Inc. ©2001

FIG. 15

NOODLE
*insurance*
*an intelligent place to buy insurance*

Home | Get Free Quote | Products & Services | My Business Insurance | About Us | Glossary | Partner Network

Please Confirm The Insurance For Purchase

The purchase request is almost complete. Simply verify some of the information you've provided and when you're confident that all the information is correct, please select the "Purchase" button at the bottom of the page.

| Insurance Company | Policy Description | | Estimated Annual Premium |
|---|---|---|---|
| Kemper | Bbread and Other Bakery Products, Except Cookies and Crackers Auto Policy | | $1,800.00 |

Please Verify The Billing Address

This is the address provided. Please make any corrections or provide a preferred billing address, such as a Post Office Box, by selecting "Edit"

Joe Raysa
address1
CHICAGO, IL 60603    [EDIT]

How Would You Like To Pay?

Billing Plans

| | Bill Plan | Down Payment | Bill Plan Installment Amounts |
|---|---|---|---|
| ○ | 10 Pay | None | 10 Equal Installments |
| ○ | 8 Pay | None | 8 Equal Installments |
| ○ | 4 Pay | None | 4 Equal Installments |
| ○ | 1 Pay (prepaid) | 100 | N/A |

Important: Does this purchase replace one or more policies befor their expiration date?    ○ Yes

---

Hide Webster

InsuranceNoodle Services
When you purchase a policy with us, we're dedicated to providing you top-quality service.

Our services include:
- Assisting in the claims process.
- Providing Certificates of Insurance.
- Making adjustments to policies based on changes in the business. More

METHODS AND APPARATUS FOR SELECTING AN INSURANCE CARRIER FOR AN ONLINE INSURANCE POLICY PURCHASE

TECHNICAL FIELD

The present invention relates in general to electronic commerce and, in particular, to methods and apparatus for selecting an insurance carrier for an online insurance policy purchase.

BACKGROUND

Insurance companies issue policies to insure against different types of risk. Whether a particular insurance carrier has an interest in covering a particular type of risk is typically determined by a set of rules that are applied based upon that carrier's historical underwriting experience. Insurance agencies generally have multiple contracts with different insurance carriers and act as an agent for the end consumer or business. Based upon the industry and type of risk, the agent makes a determination as to which of their insurance carriers have an appetite to write insurance for the risk.

Historically insurance companies provide the agents with documentation based upon geographic location and the U.S. Government OSHA Standard Industrial Classification (SIC) coding system as to what types of businesses they are interested in writing. When an application for insurance is completed, the agent needs to make a determination as to which carrier(s) they will send the application. Typically, this determination is made by referring to the carriers' documentation or from personal knowledge. Without accurate documentation and/or personal knowledge, an application may be rejected as an inappropriate submission by the insurance carrier, thereby delaying the ability of the agent to provide coverage to the business.

BRIEF DESCRIPTION OF THE DRAWINGS

Features and advantages of the disclosed system will be apparent to those of ordinary skill in the art in view of the detailed description of exemplary embodiments which is made with reference to the drawings, a brief description of which is provided below.

FIG. 8 is a screen-shot of an exemplary web page including a text entry zip code prompt.

FIG. 11 is a screen-shot of an exemplary web page including indications of selected insurance products.

FIG. 13 is a screen-shot of an exemplary web page including dynamically generated questions.

FIG. 14 is a screen-shot of an exemplary web page including insurance quotes.

FIG. 15 is a screen-shot of an exemplary web page confirming an insurance purchase.

DETAILED DESCRIPTION OF EXEMPLARY EMBODIMENTS

In general, the system described herein allows a user at a client device, such as a personal computer connected to the Internet, to receive a plurality of business insurance quotes with minimal data input requirements. A plurality of insurance carriers are narrowed down to a few relevant insurance carriers based on the user's zip code, standard industrial code (SIC), desired insurance products, a small number of "kill" questions, and a customized insurance application which is dynamically generated in response to previous answers.

Figure 1:
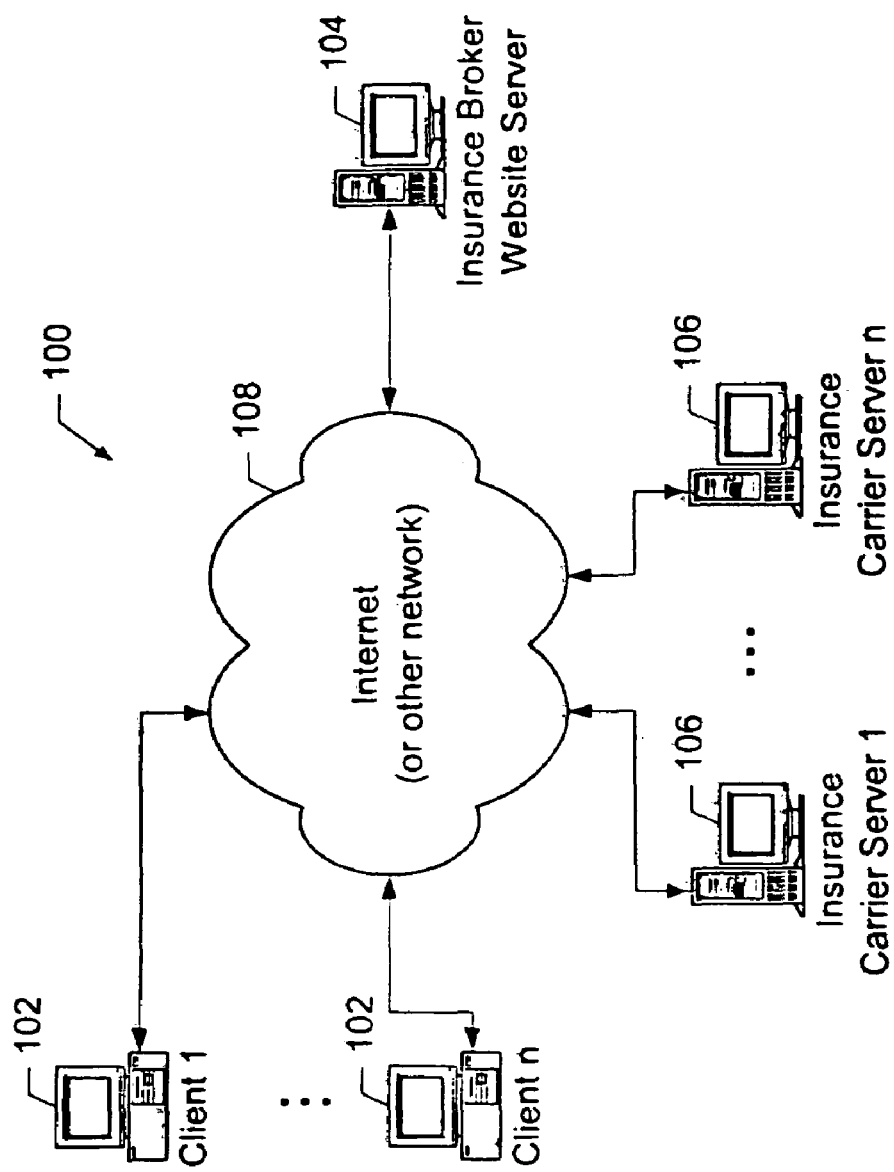
FIG. 1 is a high level block diagram of a communications system illustrating an exemplary environment of use for the present invention.

A high level block diagram of an exemplary network communications system 100 capable of employing the teachings of the present invention is illustrated in FIG. 1. Typically, the system 100 includes one or more client devices 102, one or more insurance broker website servers 104, and one or more insurance carrier servers 106. Each of these devices may communicate with each other via a connection to the Internet or some other wide area network 108.

Typically, broker servers 104 store a plurality of files, programs, and/or web pages for use by the client devices 102 and/or the carrier servers 106. One broker server 104 may handle requests from a large number of clients 102. Accordingly, each broker server 104 is typically a high end computer with a large storage capacity, one or more fast microprocessors, and one or more high speed network connections. Conversely, relative to a typical broker server 104, each client device 102 typically includes less storage capacity, a single microprocessor, and a single network connection.

Figure 2:
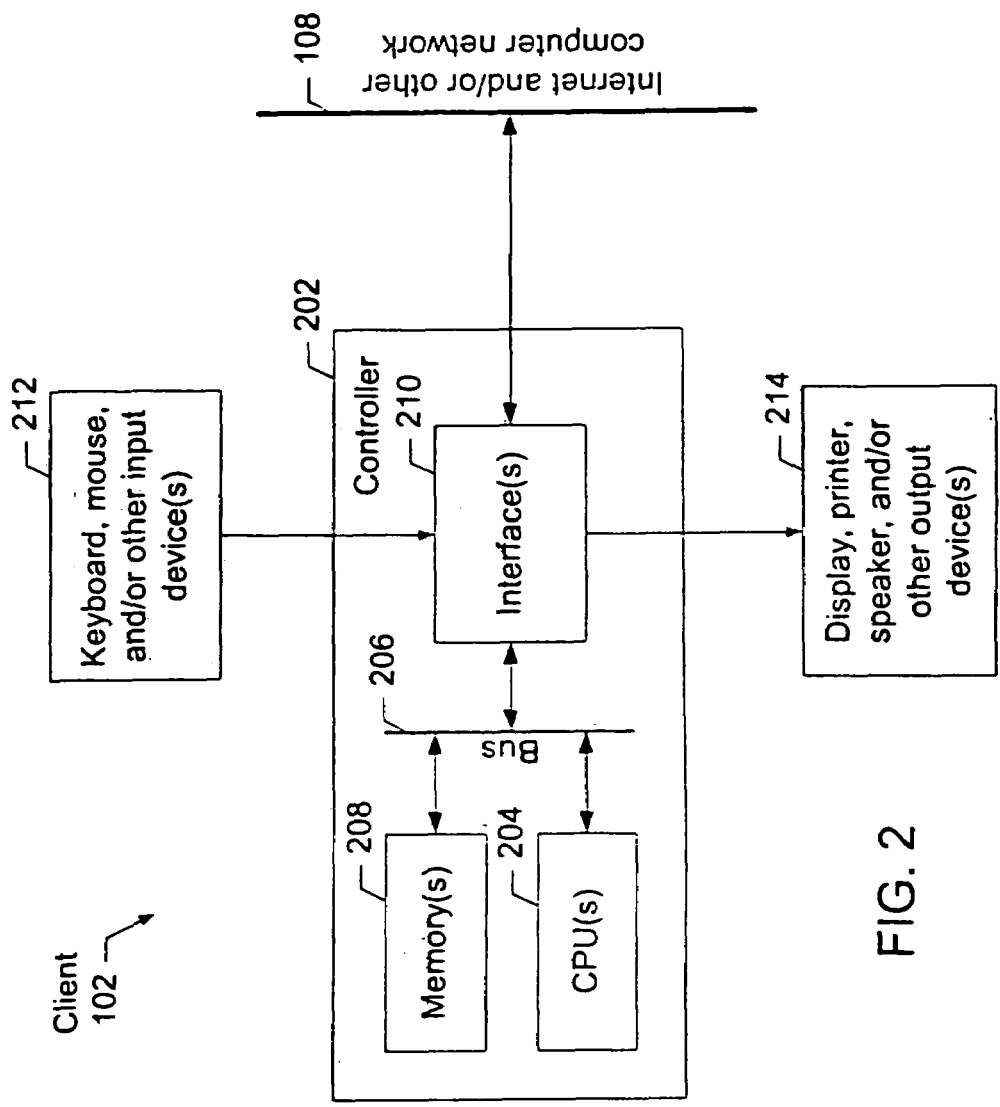
FIG. 2 is a more detailed block diagram of one of the client devices illustrated in FIG. 1.

A more detailed block diagram of a client device 102 is illustrated in FIG. 2. The client device may be a personal computer (PC), a personal digital assistant (PDA), an Internet appliance, a cellular telephone, or any other communication device. The client 102 includes a controller 202 which preferably includes a central processing unit 204 electrically coupled by an address/data bus 206 to a memory device 208 and an interface circuit 210. The CPU 204 may be any type of well known CPU, such as an Intel Pentium™ processor. The memory device 208 preferably includes volatile memory and non-volatile memory. Preferably, the memory device 208 stores a software program that interacts with the broker server 104 as described below. This program may be executed by the CPU 204 in a well known manner. The memory device 208 may also store digital data indicative of documents, files, programs, web pages, etc. retrieved from a server 104, 106 and/or loaded via an input device 212.

The interface circuit 210 may be implemented using any type of well known interface standard, such as an Ethernet interface and/or a Universal Serial Bus (USB) interface. One or more input devices 212 may be connected to the interface circuit 210 for entering data and commands into the controller 202. For example, the input device 212 may be a keyboard, mouse, touch screen, track pad, track ball, isopoint, and/or a voice recognition system.

One or more displays, printers, speakers, and/or other output devices 214 may also be connected to the controller 202 via the interface circuit 210. The display 214 may be cathode ray tube (CRTs), liquid crystal displays (LCDs), or any other type of display. The display 214 generates visual displays of data generated during operation of the client 102. The display 214 is typically used to display web pages received from the broker server 104. The visual displays may include prompts for human operator input, calculated values, etc.

The client 102 may also exchange data with other devices via a connection to the network 108. The network connection may be any type of network connection, such as an Ethernet connection, digital subscriber line (DSL), telephone line, coaxial cable, etc. Users of the system 100 are preferably required to register with the broker server 104. In such an instance, each user may choose a user identifier and a password which may be required for the activation of services. The user identifier and password may be passed across the Internet 108 using encryption built into the user's browser. Alternatively, the user identifier and/or password may be assigned by the broker server 104.

Figure 3:
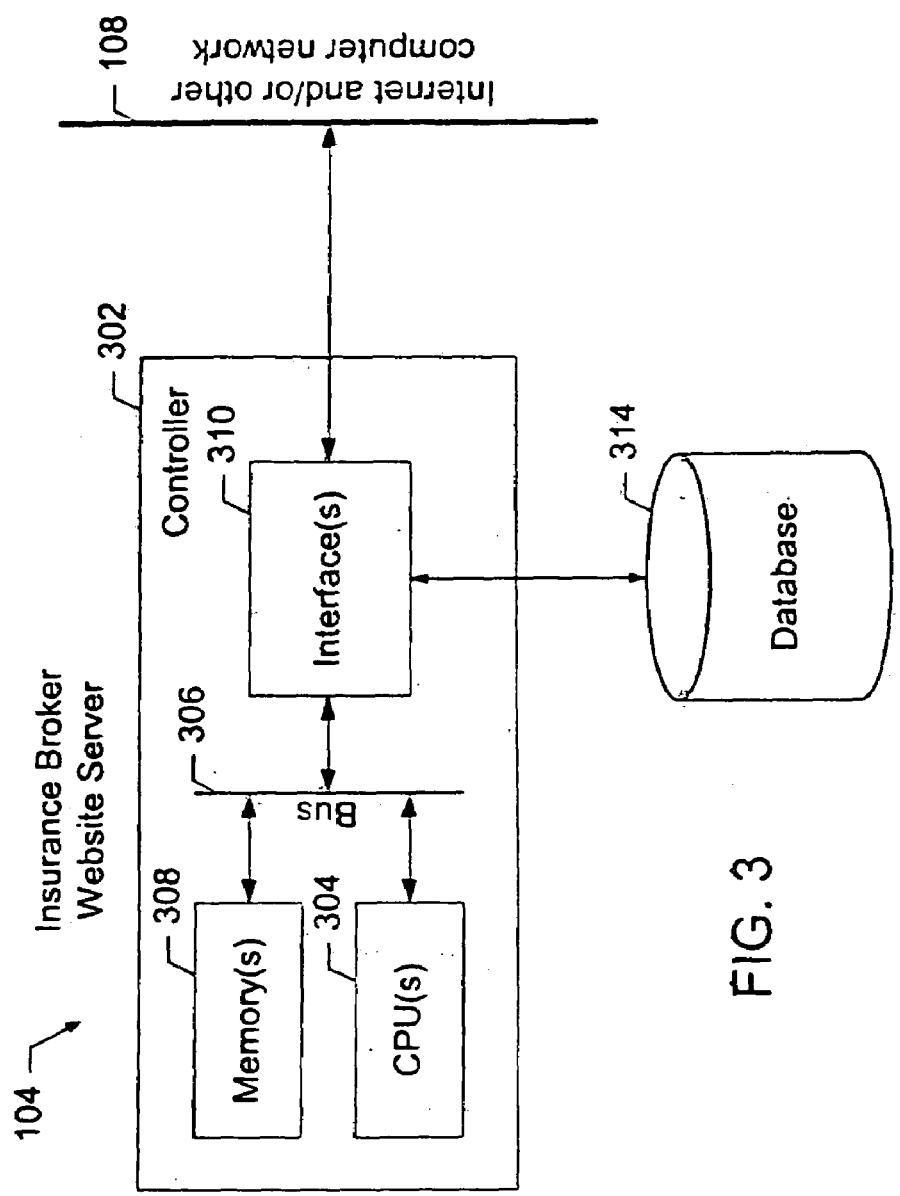
FIG. 3 is a more detailed block diagram showing one embodiment of the insurance broker server illustrated in FIG. 1.

A more detailed block diagram of a broker server 104 is illustrated in FIG. 3. Like the client device 102, the controller 302 in the broker server 104 preferably includes a central processing unit 304 electrically coupled by an address/data bus 306 to a memory device 308 and a network interface circuit 310. However, the sever controller 302 is typically more powerful than the client controller 202. Again, the CPU 304 may be any type of well known CPU, such as an Intel Pentium™ processor, and the memory device 308 preferably includes volatile memory and non-volatile memory. Preferably, the memory device 308 stores a software program that implements all or part of the method described below. This program may be executed by the CPU 304 in a well known manner. However, some of the steps described in the method below may be performed manually or without the use of the broker server 104. The memory device 308 and/or a separate database 314 also store files, programs, web pages, etc. for use by servers 104, 106 and/or the client devices 102.

The server 104 may exchange data with other devices via a connection to the network 108. The network interface circuit 310 may be implemented using any data transceiver, such as an Ethernet transceiver. The network 108 may be any type of network, such as a local area network (LAN) and/or the Internet.

Figure 4:
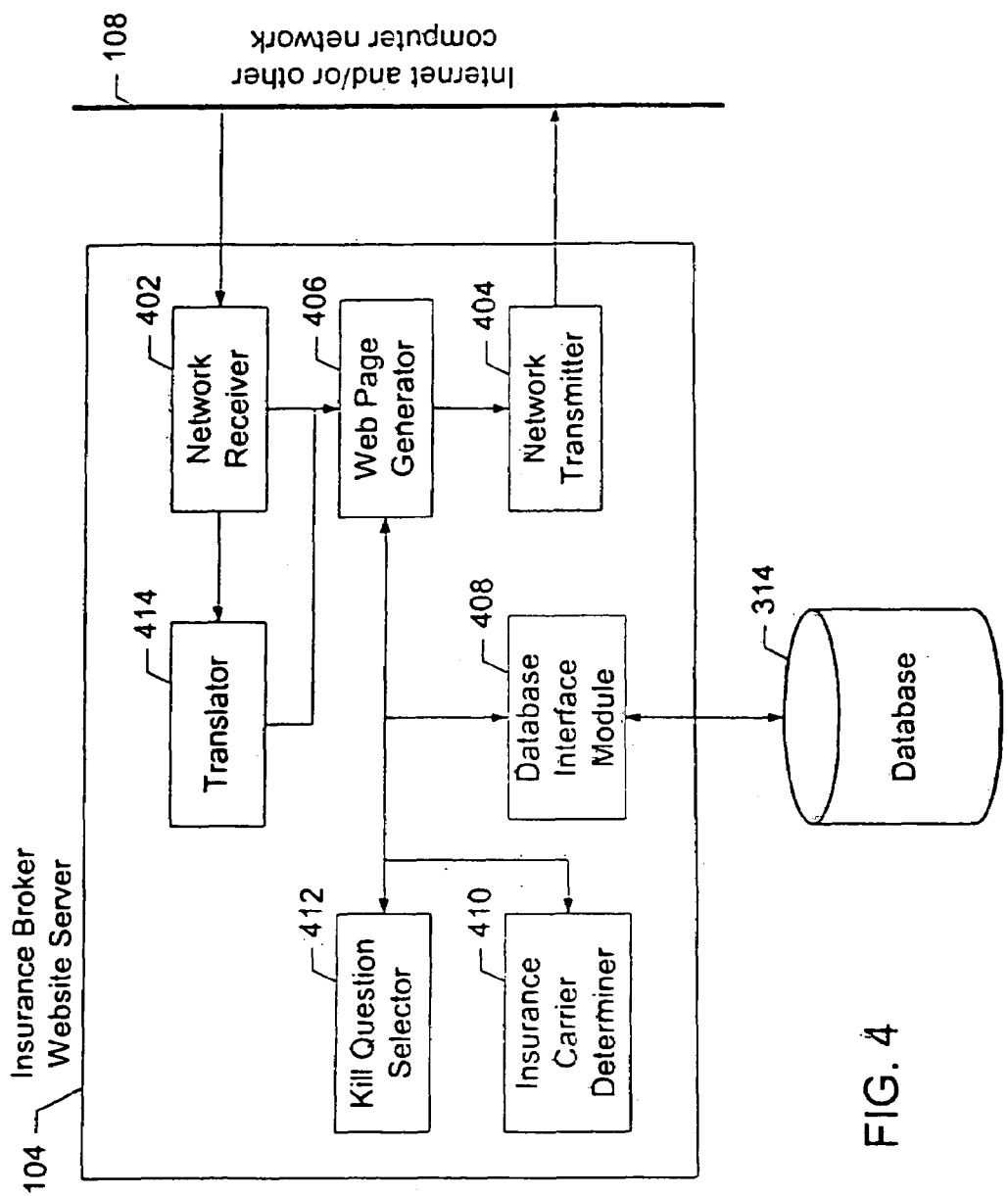
FIG. 4 is a more detailed block diagram showing another embodiment of the insurance broker server illustrated in FIG. 1.

A more detailed block diagram of another embodiment of the broker server 104 is illustrated in FIG. 4. In this embodiment, the broker server 104 includes a plurality of interconnected modules 402–414. Each of the modules may be implemented by a microprocessor executing software instructions and/or conventional electronic circuitry. In addition, a person of ordinary skill in the art will readily appreciate that certain modules may be combined or divided according to customary design constraints.

For the purpose of receiving web page requests, standard industrial codes, zip codes, kill question responses, application data, product selections, quote responses, purchase requests, and other data, the broker server 104 preferably includes a network receiver 402. The network receiver 402 is operatively coupled to the network 108 in a well known manner. For example, the network receiver 402 may be an Ethernet interface circuit electrically coupled to the Internet via an Ethernet cable.

For the purpose of transmitting web pages, standard industrial code prompts, zip code prompts, kill questions, insurance product data, application data, quote responses, and other data, the broker server 104 preferably includes a network transmitter 404. The network transmitter 404 is operatively coupled to the network 108 in a well known manner. For example, the network transmitter 404 may also be an Ethernet interface circuit electrically coupled to the Internet via an Ethernet cable.

For the purpose of retrieving and/or generating web pages, the broker server 104 preferably includes a web page generator 406. The web page generator 406 is operatively coupled to the network receiver 402 and the network transmitter 404. The web page generator 406 generates web pages which preferably include standard industrial code prompts, zip code prompts, kill questions, insurance product data, application questions, quote responses, and/or other data.

For example, the web page generator 406 preferably retrieves a web page including a standard industrial code prompt and/or a zip code prompt in response to a web page request. After a standard industrial code and a zip code are received from a client 102, the web page generator 406 preferably generates an insurance application web page including one or more kill questions and/or one or more regular application questions. Kill questions are questions designed to eliminate one or more potential insurance carriers early in the carrier selection process. Kill questions are preferably selected based on the received standard industrial code, received zip code, and/or selected carriers as described in detail below. Preferably, the insurance application is arranged to provide the kill questions before the majority of the regular application questions.

For the purpose of storing and retrieving data from the database 314, the broker server 104 preferably includes a database interface module 408. The database interface module 408 is operatively coupled to the database 314 and the web page generator 406. The database interface module 408 stores and retrieves web page requests, web pages, web page data, standard industrial code prompts, standard industrial codes, zip code prompts, zip codes, kill questions, kill question responses, application questions, application data, insurance product data, product selections, quote responses, purchase requests, and other data.

For the purpose of selecting insurance carriers and/or products, the broker server 104 preferably includes a insurance carrier determiner 410. The insurance carrier determiner 410 is operatively coupled to the database interface module 408 and the web page generator 406. The insurance carrier determiner 410 preferably selects a plurality of insurance carriers from the database 314 based on a received standard industrial code and a received zip code. In addition, the insurance carrier determiner 410 preferably selects one or more candidate insurance carriers from the selected plurality of insurance carriers based on a received kill question response and/or a received product selection.

For the purpose of selecting one or more kill questions, the broker server 104 includes a kill question selector 412. The kill question selector 412 is operatively coupled to the database interface module 408 and the web page generator 406. The kill question selector 412 preferably retrieves one or more kill questions from the database 314 based on at least one of the insurance carriers in the selected plurality of insurance carriers.

In operation, the insurance carrier determiner 410 preferably selects an initial subset of insurance carriers based on a received standard industrial code (SIC) and a received zip code. For example, carriers A, B, C, and D may be selected from a larger group of carriers, because A, B, C, and D are the only carriers previously indicating a desire to handle the type of business indicated by the received SIC (e.g., carpenters) in the region defined by the received zip code (e.g., Chicago). The kill question selector 412 then uses the members of this subset (e.g., A, B, C, and D) to select one or more kill questions. For example, carrier A may only handle commercial carpenters and not residential carpenters. Accordingly, a predefined kill question may include check boxes for "commercial" and "residential." When a response to the selected kill question(s) is received, the insurance carrier determiner 410 may further limit the subset of insurance carriers based on the response. In the example above, carrier A may be eliminated from the first subset (i.e., A, B, C, and D) if the response indicates the carpenter performs residential work, thereby creating a reduced subset of B, C, and D. This limited subset of carriers is then used to customize the rest of the online insurance application.

For the purpose of converting quote responses and other data from a first format to a second format, the broker server 104 preferably includes a translator 414. The translator 414 is operatively coupled to the network receiver 402 and the web page generator 406. The translator 414 preferably converts facsimile data, page description files (PDF), rich text format (RTF) files, and other data to text for inclusion in one or more web pages.

Figure 5:
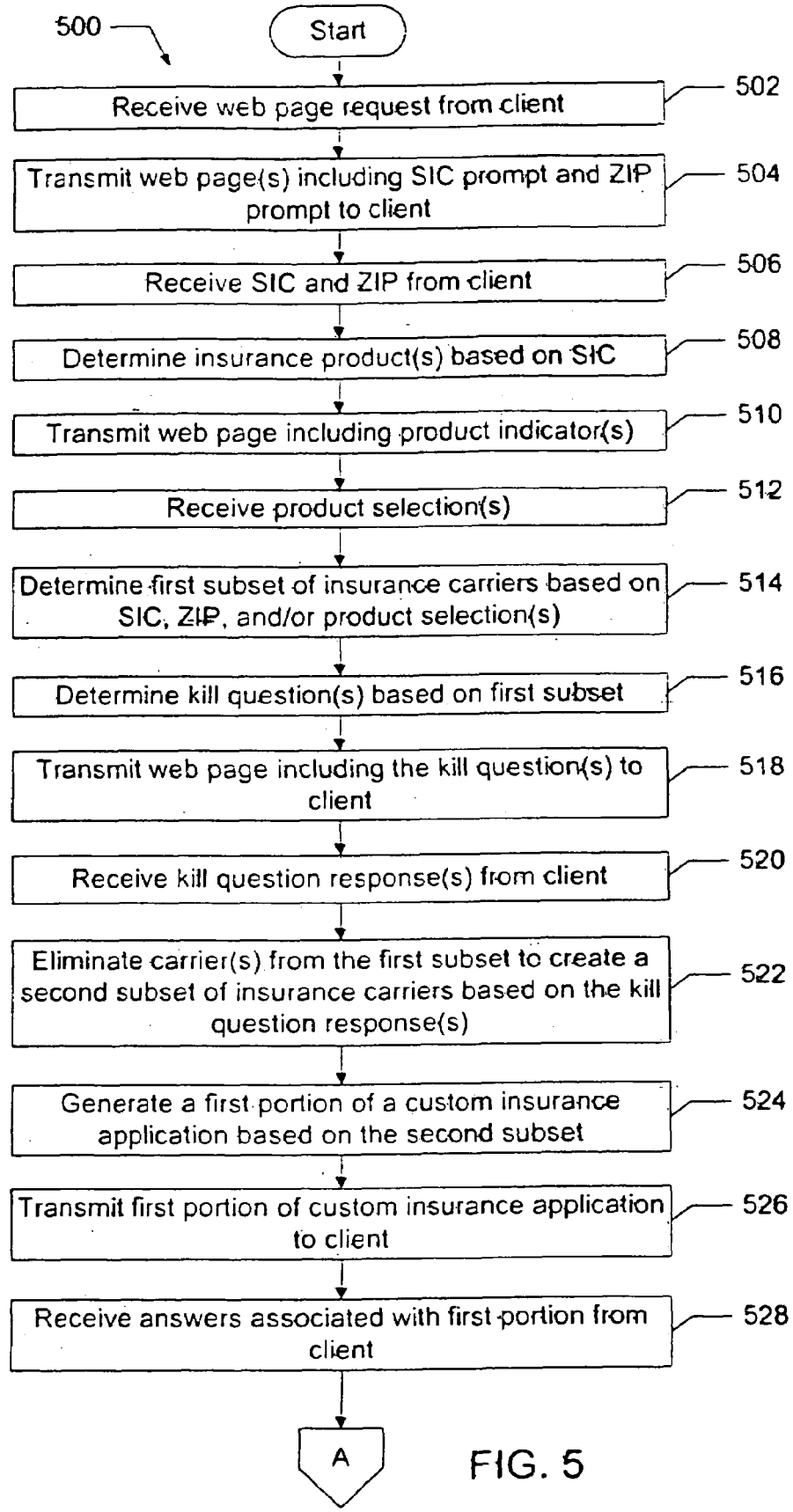
FIGS. 5–6 are a flowchart of a process for selecting an insurance carrier for an online insurance policy purchase.
Figure 6:
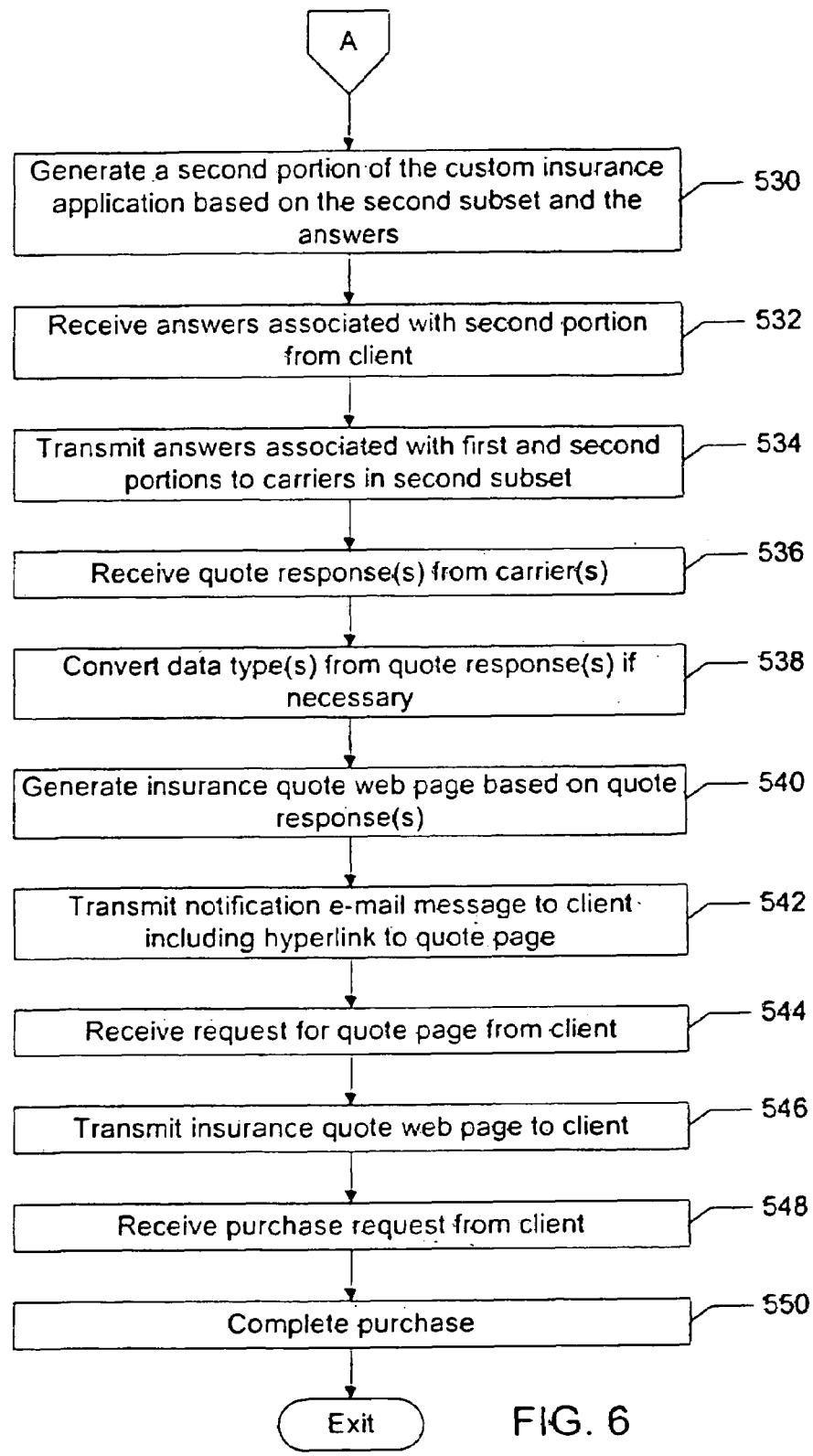

A flowchart of a process 500 for selling business insurance online is illustrated in FIGS. 5–6. Preferably, the process 500 is embodied in a software program which is stored in the broker server memory 308 and executed by the broker server CPU 304 in a well known manner. However, some or all of the steps of the process 500 may be performed manually and/or by another device. Although the process 500 is described with reference to the flowchart illustrated in FIG. 5, a person of ordinary skill in the art will readily appreciate that many other methods of performing the acts associated with process 500 may be used. For example, the order of many of the steps may be changed without departing from the scope or spirit of the present invention. In addition, many of the steps described are optional, and additional steps may be performed between the illustrated steps.

Generally, the process 500 allows a user at a client device 102 to receive a plurality of business insurance quotes with minimal data input requirements. The user may be an end user (e.g., a business needing insurance) or an insurance agent. A plurality of insurance carriers are narrowed down to a few relevant insurance carriers based on the user's zip code, standard industrial code (SIC), desired insurance products, a small number of "kill" questions, and a customized insurance application which is dynamically generated in response to previous answers.

Figure 7:
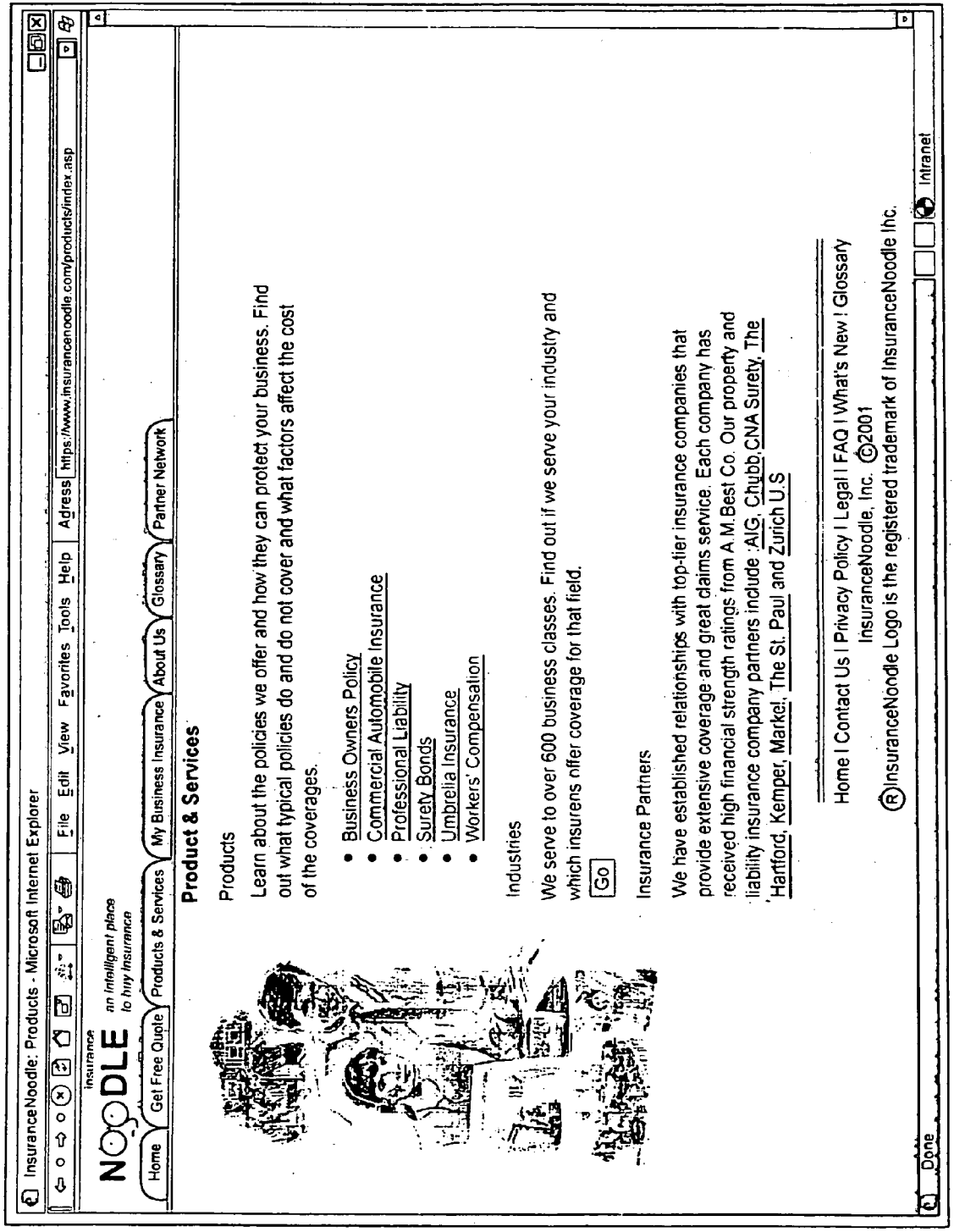
FIG. 7 is a screen-shot of an exemplary informational web page.

The process 500 begins when the broker server 104 receives a web page request from the client 102 (step 502). In the preferred embodiment, several web pages may be served by the broker server prior to a specific request to begin the quoting process. For example, several informational pages may be viewed. A screen-shot of an exemplary informational web page is illustrated in FIG. 7. In addition, the user may login before beginning the quoting process. In such an instance, certain web pages may be customized based on the "channel.". For example, an agent user may be shown more SIC choices than an end user.

Figure 9:
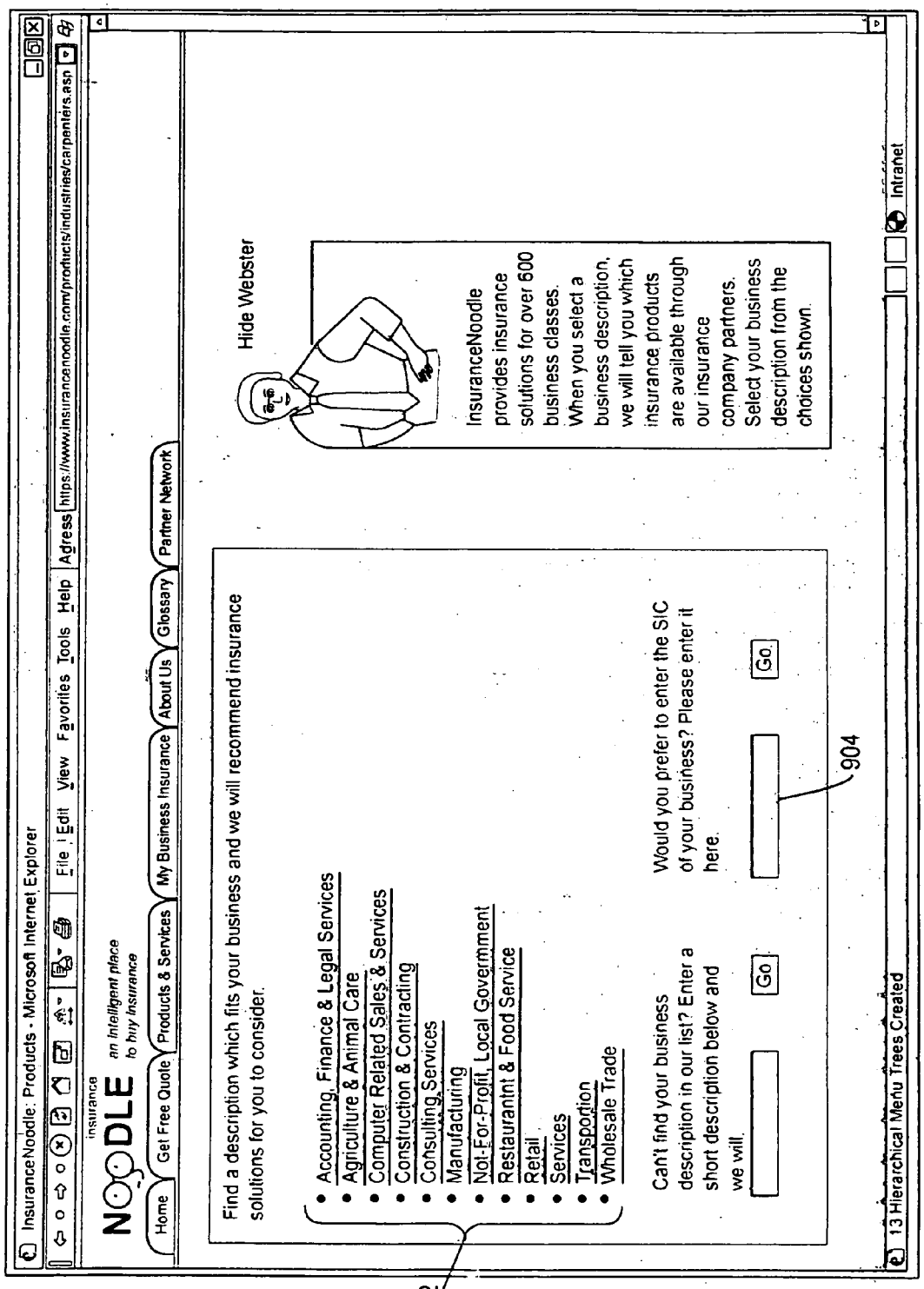
FIG. 9 is a screen-shot of an exemplary web page including hierarchical hyperlinks for SIC selection and a SIC entry box.
Figure 10:
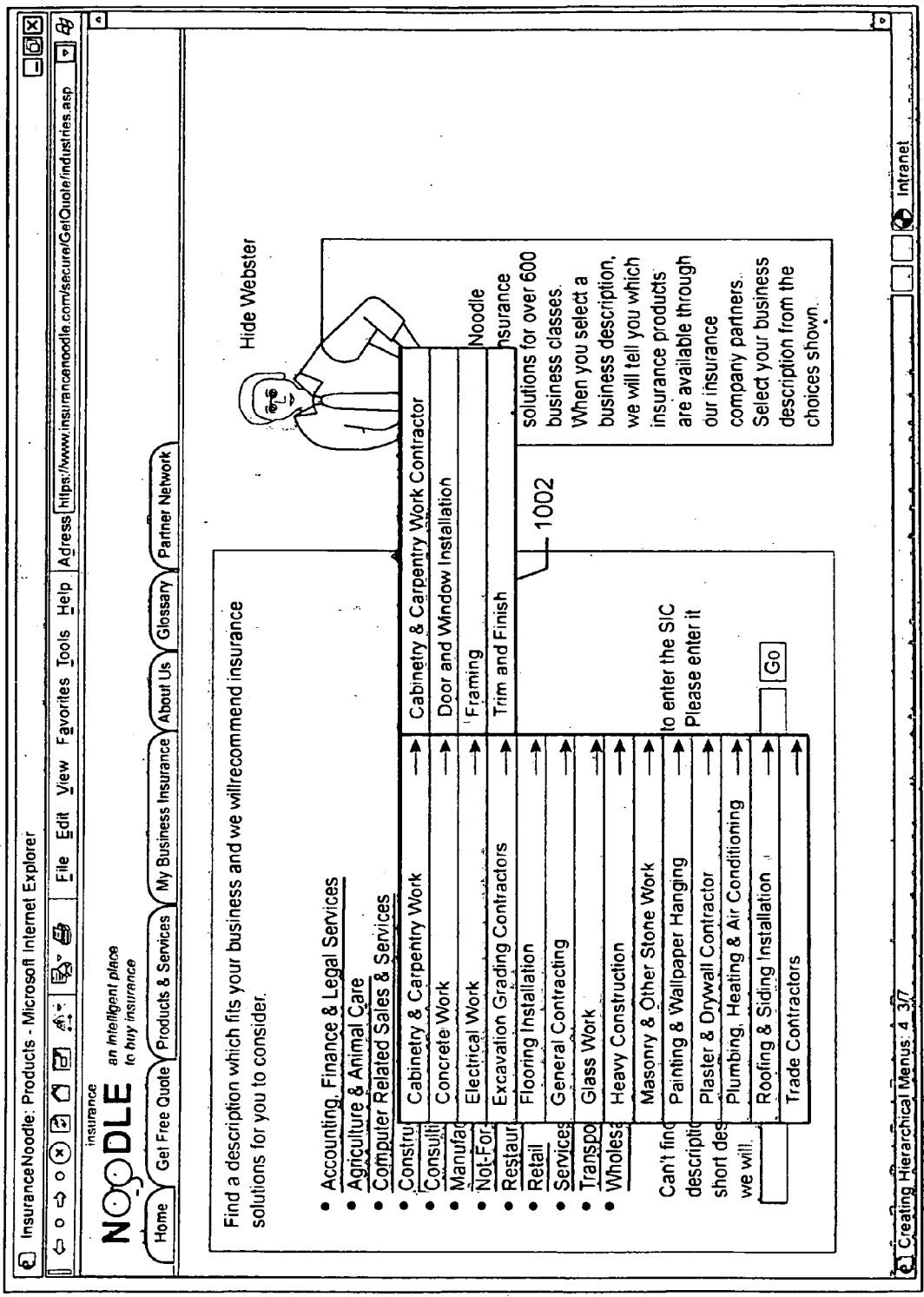
FIG. 10 is a screen-shot of an exemplary web page including a drop down SIC selection menu.

To begin the quoting process, the broker server 104 preferably transmits one or more web pages to the client 102 which include a prompt for a zip code and/or a prompt for a standard industrial code (SIC) (step 504). In one embodiment, one or both of the prompts comprise text entry boxes. A screen-shot of an exemplary web page including a text entry zip code prompt 802 is illustrated in FIG. 8. In another embodiment, one or both of the prompts comprise drop down selection menus and/or hierarchical hyperlinks. In addition, when selecting a SIC, the user may be presented with text descriptions of the SIC choices. A screen-shot of an exemplary web page including hierarchical hyperlinks 902 for SIC selection as well as a SIC entry box 904 is illustrated in FIG. 9. A screen-shot of an exemplary web page including a drop down SIC selection menu 1002 is illustrated in FIG. 10. After the user enters a SIC and a zip code at the client device 102, the SIC and zip code are transmitted to the broker server 104 (step 506).

The broker server 104 then determines one or more insurance products to present to the user based on the received SIC (step 508). For example, if the user is in the legal business, he may be offered business owner's insurance, professional liability insurance, and other types of insurance applicable to a legal services organization. Indications of the selected insurance products are then transmitted to the client 102 in the form of another web page (step 510). A screen-shot of an exemplary web page including indications of selected insurance products 1102 is illustrated in FIG. 11. In response, the broker server 104 preferably receives one or more product selections form the client device 102 (step 512). For example, the user may indicate that he is only interested in liability insurance by selecting a checkbox 1104 on the product selection web page. In addition, the user may receive additional information about a type of insurance by selecting a hyperlink 1106. At this point in the process, the user is preferably required to enter an e-mail address 1108 and select a password 1110.

The broker server 104 then determines a first subset of insurance carriers, from a plurality of insurance carriers, based on the received SIC, zip code, and/or product selection(s) (step 514). For example, one carrier from the plurality of carriers may be eliminated by a predefined regional exclusion (e.g., based on zip code or other regional identifier such as state). Another carrier may be eliminated based on a predefined SIC exclusion. Yet another carrier may be eliminated based on a predefined product exclusion. Still other carriers may be eliminated based on a combination of exclusions. For example, a particular carrier may indicate an exclusion for a certain SIC in a certain zip code, and another carrier may not handle a particular product in a certain geographic region, etc.

Figure 12A:
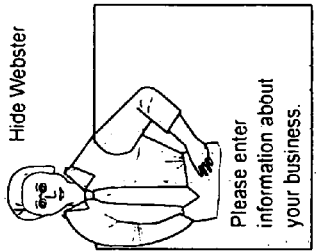
FIGS. 12a–12b are a screen-shot of an exemplary web page including kill questions.
Figure 12B:
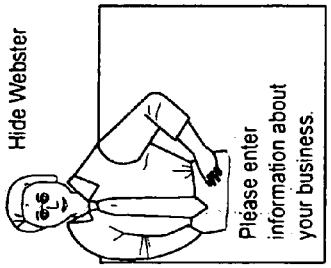

Once the first subset of carriers is determined, the broker server 104 preferably determines one or more kill questions based on the members of the first subset (step 516). For example, the received SIC may indicate the user is a carpenter, but a particular carrier in the first subset may only handle commercial carpenters and not residential carpenters. Accordingly, a predefined "carpenter type" kill question may be selected from a plurality of predefined kill questions. Another web page is then transmitted to the client 102 which preferably includes the selected kill question(s) (step 518). A screen-shot of an exemplary web page including kill questions 1202 is illustrated in FIGS. 12a–12b.

Based on the received responses to the kill question(s) (step 520), the broker server 104 preferably eliminates one or more carriers from the first subset to create a second subset of insurance carriers (step 522). For example, if the kill question response indicates that the user is a residential carpenter, and one of the carriers in the first subset only handles commercial carpenters, then that carrier is eliminated from the first subset (i.e., that carrier is not included in the second subset of carriers).

The list of carriers remaining in the second subset are then preferably used to dynamically generate a first portion of a custom insurance application (step 524). Preferably, the first portion includes questions common to more than one carrier in the second subset and/or questions specific to certain carriers in the second subset. This first portion of the custom insurance application is then transmitted to the client as another web page (step 526). A screen-shot of an exemplary web page including dynamically generated questions 1302 is illustrated in FIG. 13.

The received answers to the first portion of the application (step 528) are preferably used to dynamically generate a second portion of the custom insurance application (step 530). For example, if the user indicates that his building includes a restaurant in the first portion, a question to determine the percent of sales at the restaurant attributed to liquor may be asked in the second portion. Subsequently, the answers to the second portion of the application are received by the broker server 104 (step 532). Although only two application portions are described here for simplicity in explanation, a person of ordinary skill in the art will readily appreciate that any number of additional portions, customized based on previous answers, may be generated without departing from the scope and spirit of the present invention.

Once the answers are collected form the client 102, some or all of the answers are transmitted to one or more carrier servers 106 identified by the second subset of carriers (step 534). In response, the broker server 104 is provided with one or more quote responses from the carrier servers 106 (step 536). In some instances, the quote responses may require conversion (step 538). For example, a facsimile response may be converted to text automatically and/or entered manually. Similarly, a page description file (PDF), rich text format (RTF) file, and/or other file may be converted to text and/or some other data format for inclusion in a insurance quote web page.

Preferably, the quote responses are then used to generate an insurance quote web page (step 540), and an e-mail notification is transmitted to the client 102 (step 542). Preferably, the e-mail notification includes a hyperlink to the insurance quote web page. In this manner, the user may request the insurance quote web page (step 544) by simply clicking on the hyperlink in the e-mail notification. In response, the broker server 104 transmits the insurance quote web page (step 546). A screen-shot of an exemplary web page including insurance quotes 1402 is illustrated in FIG. 14.

If the user decides to purchase one or more insurance products detailed in the insurance quote web page, the client 102 preferably transmits a purchase request to the broker server 104 (step 548), and the broker server 104, in conjunction with one or more carrier servers 106, preferably completes the purchase (step 550). In some embodiments, certain payment options may be presented to the user based on the selected carrier(s), the selected insurance products, the channel (e.g., end user or agent), and/or other variables. For example, an agent user may be presented with more payment option than and end user, or certain carriers may offer different payment options from other carriers. A screen-shot of an exemplary web page confirming an insurance purchase is illustrated in FIG. 15.

In summary, persons of ordinary skill in the art will readily appreciate that methods and apparatus for selecting an insurance carrier for an online insurance policy purchase has been provided. Users of systems implementing the teachings described herein can enjoy reduced data input and higher relevancy of selected insurance carriers.

The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description, but rather by the claims appended hereto.

What is claimed is:

1. An apparatus structured to select a business insurance carrier from a plurality of insurance carriers, the apparatus comprising:
    an Internet receiver;
    an Internet transmitter;
    a memory device;
    a web page generator operatively coupled to the Internet receiver, the Internet transmitter, and the memory device, the web page generator being structured to transmit a first web page to a client device via the Internet transmitter, the first web page including a standard industrial code (SIC) prompt and a zip code prompt, the web page generator being further structured to transmit a second web page to the client device via Internet transmitter, the second web page including a kill question;
    an insurance carrier determination module operatively coupled to the Internet receiver and the memory device, the insurance carrier determination module being structured to select the plurality of insurance carriers from the memory device based on a standard industrial code and a zip code input in the first web page at the client device and received via the Internet receiver, the insurance carrier determination module being further structured to select a candidate insurance carrier from the plurality of insurance carriers based on a kill question response input in the second web page at the client device and received via the Internet receiver; and
    a kill question selector operatively coupled to the memory device, the kill question selector being structured to retrieve the kill question from the memory device based on at least one insurance carrier in the plurality of insurance carriers.

2. An apparatus as defined in claim 1, wherein the web page generator is further structured to determine a plurality of available insurance products based on the received standard industrial code and transmit a third web page to the client device via the Internet transmitter, the third web page including the plurality of available insurance products.

3. An apparatus as defined in claim 1, wherein the web page generator is further structured to receive a product selection from the client device via the Internet receiver and the insurance carrier determination module is further structured to select the candidate insurance carrier from the plurality of insurance carriers based on the received product selection.

4. An apparatus as defined in claim 1, wherein the web page generator is further structured to receive application data from the client device via the Internet receiver and transmit at least a portion of the application data to the candidate insurance carrier via Internet transmitter.

5. An apparatus as defined in claim 1, wherein the web page generator is further structured to receive a quote response from the candidate insurance carrier via the Internet receiver and transmit a third web page to the to the client device via the Internet transmitter, the third web page including at least a portion of the quote response.

6. An apparatus as defined in claim 5, further comprising a translation unit, the translation unit being structured to convert the portion of the quote response from a first format to a second format, the first format being different than the second format.

7. An apparatus as defined in claim 6, further comprising a translation unit, the translation unit being structured to convert the portion of the quote response from facsimile data to text data.

8. An apparatus as defined in claim 6, further comprising a translation unit, the translation unit being structured to convert the portion of the quote response from page description file (PDF) data to text data.

9. An apparatus as defined in claim 6, further comprising a translation unit, the translation unit being structured to convert the portion of the quote response from rich text format (RTF) data to text data.

10. A method of selling business insurance, the method comprising:
transmitting a standard industrial code (SIC) prompt and a zip code prompt to a client device via a network;
receiving a standard industrial code and a zip code from the client device via the network;
determining a plurality of insurance carriers based on the standard industrial code and the zip code;
retrieving a predetermined kill question associated with at least one insurance carrier in the plurality of insurance carriers from a memory device;
transmitting the predetermined kill question to the client device via the network;
receiving a kill question response from the client device via the network;
determining at least one candidate insurance carrier by eliminating the at least one insurance carrier associated with the predetermined kill question from the plurality of insurance carriers based on the kill question response;
generating a customized insurance application based on the at least one candidate insurance carrier; and
transmitting the customized insurance application to the client device via the network.

11. A method as defined in claim 10, further comprising:
receiving an answer to the customized insurance application from the client device via the network; and
generating a further customized insurance application based on the received answer.

12. A method as defined in claim 10, further comprising:
determining a plurality of available insurance products based on the received standard industrial code;
transmitting a product selection page to the client device via the network, the product selection page including the plurality of available insurance products; and
receiving a product selection from the client device via the network, wherein the step of determining at least one candidate insurance carrier further comprises determining the at least one candidate insurance carrier by eliminating a group of insurance carriers from the plurality of insurance carriers based on the received product selection.

13. A method as defined in claim 10, further comprising determining a carrier need based on a plurality of kill question responses.

14. A method as defined in claim 10, further comprising:
receiving application data from the client device via the network;
transmitting at least a portion of the application data to the at least one candidate insurance carrier via the network;
receiving a quote response from the at least one candidate insurance carrier;
generating a customer quote page by converting the quote response to a predetermined digital format; and
transmitting the customer quote page to the client device via the network.

15. A method as defined in claim 14, wherein receiving a quote response from the at least one candidate insurance carrier comprises receiving a facsimile message from the at least one candidate insurance carrier and wherein generating a customer quote page by converting the quote response to a predetermined digital format comprises manually entering information from the facsimile message into a computing device for inclusion in a web page.

16. A method as defined in claim 14, wherein generating a customer quote page by converting the quote response to a predetermined digital format comprises converting a portion of a page description file (PDF) to ASCII text for inclusion in a web page.

17. A method as defined in claim 14, wherein generating a customer quote page by converting the quote response to a predetermined digital format comprises converting a portion of a rich text format (RTF) file to ASCII text for inclusion in a web page.

18. A method as defined in claim 14, further comprising transmitting a notification e-mail message to the client device via the network, the notification e-mail message including a hyperlink to the customer quote page.

19. An apparatus structured to sell an insurance policy, the apparatus comprising:
an Internet receiver;
an Internet transmitter;
a processing unit operatively coupled to the Internet receiver and the Internet transmitter; and
a memory device operatively coupled to the processing unit, the memory device storing a software program structured to cause the processing unit to:
transmit a standard industrial code (SIC) prompt and a zip code prompt via the Internet transmitter;
determine a plurality of insurance carriers in response to receiving a standard industrial code and a zip code via the Internet receiver;
retrieve a predetermined kill question associated with at least one insurance carrier in the plurality of insurance carriers from the memory device;
transmit the predetermined kill question via the Internet transmitter;
determine at least one candidate insurance carrier by eliminating the at least one insurance carrier associated with the predetermined kill question from the plurality of insurance carriers based on a kill question response received via the Internet receiver;
generate a customized insurance application based on the at least one candidate insurance carrier; and
transmit the customized insurance application via the Internet transmitter.

20. An apparatus as defined in claim 19, wherein the software program is further structured to cause the processing unit to:
determine a plurality of available insurance products based on the received standard industrial code; and transmit a product selection page via the Internet transmitter, the product selection page including the plurality of available insurance products.

21. An apparatus as defined in claim 19, wherein the software program is further structured to cause the processing unit to:

receive application data from via the Internet receiver;

transmitting at least a portion of the application data to the at least one candidate insurance carrier via the via the Internet transceiver;

receive a quote response from the at least one candidate insurance carrier via the Internet receiver;

generate a customer quote page by converting the quote response to a predetermined digital format; and transmit the customer quote page via the Internet transmitter.

22. An apparatus as defined in claim 21, wherein the software program is further structured to cause the processing unit to generate ASCII text for inclusion in the customer quote page from facsimile data received via the Internet receiver from an insurance carrier.

23. An apparatus as defined in claim 21, wherein the software program is further structured to cause the processing unit to generate ASCII text for inclusion in the customer quote page from a page description file (PDF) received via the Internet receiver from an insurance carrier.

24. An apparatus as defined in claim 21, wherein the software program is further structured to cause the processing unit to generate ASCII text for inclusion in the customer quote page from a rich text format (RTF) file received via the Internet receiver from an insurance carrier.

25. A computer readable medium storing a software program structured to cause an Internet server to:

transmit a standard industrial code (SIC) prompt and a zip code prompt;

determine a plurality of insurance carriers in response to receiving a standard industrial code and a zip code;

retrieve a predetermined kill question associated with at least one insurance carrier in the plurality of insurance carriers;

transmit the predetermined kill question;

determine at least one candidate insurance carrier by eliminating the at least one insurance carrier associated with the predetermined kill question from the plurality of insurance carriers based on a kill question response;

generate a customized insurance application based on the at least one candidate insurance carrier; and transmit the customized insurance application.

* * * * *